US008416843B2

United States Patent
Shalita et al.

(10) Patent No.: US 8,416,843 B2
(45) Date of Patent: Apr. 9, 2013

(54) POWER BACK-OFF MODE AND CIRCUIT FOR 100BASET

(75) Inventors: Oren Shalita, Tel Aviv (IL); Shlomy Chaikin, Moshav Mazor (IL)

(73) Assignee: Texas Instruments Incorporated, Dallas, TX (US)

( * ) Notice: Subject to any disclaimer, the term of this patent is extended or adjusted under 35 U.S.C. 154(b) by 479 days.

(21) Appl. No.: 12/750,452

(22) Filed: Mar. 30, 2010

(65) Prior Publication Data

US 2011/0243206 A1  Oct. 6, 2011

(51) Int. Cl.
*H04B 3/00* (2006.01)
*H04B 17/00* (2006.01)

(52) U.S. Cl. .......................................... 375/224; 375/257
(58) Field of Classification Search .................. 375/222, 375/257, 377, 224; 370/201, 282
See application file for complete search history.

(56) References Cited

U.S. PATENT DOCUMENTS

| | | | |
|---|---|---|---|
| 7,375,532 B1 * | 5/2008 | Lo et al. ........................ | 324/534 |
| 7,646,699 B2 * | 1/2010 | Tellado et al. ................ | 370/201 |
| 2006/0023735 A1 * | 2/2006 | Sasson ........................... | 370/445 |
| 2007/0140289 A1 | 6/2007 | Tellado et al. | |
| 2007/0269022 A1 | 11/2007 | Taich et al. | |

FOREIGN PATENT DOCUMENTS

WO  WO0027671  5/2000

OTHER PUBLICATIONS

PCT Search Report mailed Aug. 25, 2011.

* cited by examiner

*Primary Examiner* — Khanh C Tran
(74) *Attorney, Agent, or Firm* — Alan A. R. Cooper; Wade J. Brady, III; Frederick J. Telecky, Jr.

(57) ABSTRACT

Generally, 100BaseT allows for the establishment of links on cables (such as Category 5 or CAT5 cables) up to 120 m or more in length. In a given industrial Ethernet system, many of the cables deployed will be less than 120 m in length, and, in fact, many of the cables are much shorter than 120 m. Yet, the transmission amplitude output from each unit is generally the same, regardless of cable length. Here, Power Back Off (PBO) circuitry is provided in a unit that operates in a PBO mode to passively estimate a cable length and adjust its corresponding transmission amplitudes to generally match the estimated cable length so as to reduce power consumption.

18 Claims, 1 Drawing Sheet

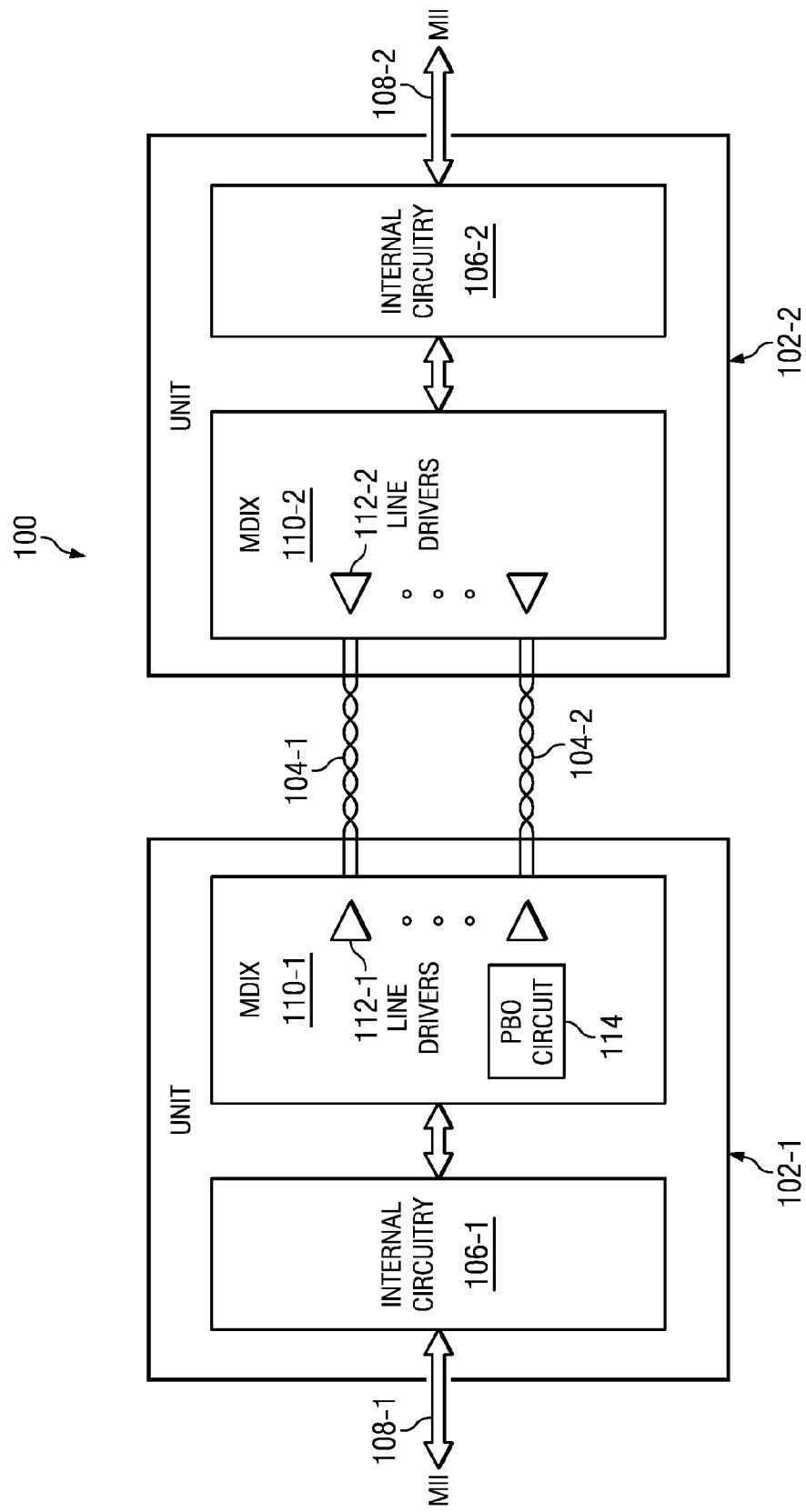

US 8,416,843 B2

POWER BACK-OFF MODE AND CIRCUIT FOR 100BASET

TECHNICAL FIELD

The invention relates generally to Ethernet and, more particularly, to a power back-off (PBO) mode and circuit for 100BaseT Ethernet.

BACKGROUND

Currently, there are numerous Institute of Electrical and Electronics Engineers (IEEE) standards for Ethernet. Some examples are 10BaseT, 100BaseT, and 1000BaseT, which are enumerated and described for several different types of transmission media (i.e., twisted-pair). Specifically, though, 100BaseT for twisted-pairs (which is described by IEEE 802.3u and that is hereby incorporated by reference for all purposes) has largely fallen into disuse in favor of higher speed standards (i.e., 1000BaseT) with exception to many industrial applications. In other words, 100BaseT is still widely used for industrial Ethernet.

Generally, 100BaseT allows for the establishment of links on cables (such as Category 5 or CAT5 cables) up to 120 m or more in length. In a given industrial Ethernet system, many of the cables deployed will be less than 120 m in length, and, in fact, many of the cables are much shorter than 120 m. Yet, the transmission amplitude output from each unit is generally the same, regardless of cable length. Usually, in these shorter cables the 100BaseT physical layer (PHY) attenuates incoming signals, resulting in wasted power on transmission. Because of the limited and relatively small market for 100BaseT, there has been very little development, even though there are problems that exist (such as wasted power on transmission). Thus, there is a need for a system that more efficiently uses power over 100BaseT connections.

An example of conventional systems is PCT Publ. No. WO08/027,671.

SUMMARY

A preferred embodiment of the present invention, accordingly, provides a method. The method comprises initiating a power back-off (PBO) mode for one of a plurality of units coupled to one another over a twisted-pair so as to communicate over a 100BaseT connection; converging a cable length estimation during the link up period by: transmitting idles; detecting energy from transmitted idles; and calculating the length of the twisted pair so as to generate the cable length estimation; and selecting one of a plurality of predetermined transmission amplitudes that corresponds to the cable length estimation.

In accordance with a preferred embodiment of the present invention, the step of initiating the PBO mode further comprises: initiating a drop link sequence (DLS); determining if a drop link counter has be been reset; and detecting energy transmitted across the twisted-pair if the drop link counter has been reset to begin a link up period.

In accordance with a preferred embodiment of the present invention, the link up period is greater than 500 μs.

In accordance with a preferred embodiment of the present invention, the method further comprises remaining silent for a link down period following the link up period.

In accordance with a preferred embodiment of the present invention, the link down period is greater than 750 ms.

In accordance with a preferred embodiment of the present invention, the step of initiating further comprises: resolving a link to 100BaseT, if in auto-negotiation mode; and initiating a DLS, after the step of resolving.

In accordance with a preferred embodiment of the present invention, the step of initiating further comprises: determining if an energy detector indicator is raised in force mode; and initiating a DLS if the energy detector indicator is raised.

In accordance with a preferred embodiment of the present invention, the plurality of transmission amplitudes are 0.4V, 0.6V, 0.8V, and 1.0V.

In accordance with a preferred embodiment of the present invention, an apparatus is provided. The apparatus comprises means for initiating a power back-off (PBO) mode for one of a plurality of units coupled to one another over a twisted-pair so as to communicate over a 100BaseT connection; means for converging a cable length estimation during the link up period that: transmits idles; detects energy from transmitted idles; and calculates the length of the twisted pair so as to generate the cable length estimation; and means for selecting one of a plurality of predetermined transmission amplitudes that corresponds to the cable length estimation.

In accordance with a preferred embodiment of the present invention, the means for initiating the PBO mode further comprises: means for initiating a drop link sequence (DLS); means for determining if a drop link counter has be been reset; and means for detecting energy transmitted across the twisted-pair if the drop link counter has been reset to begin a link up period.

In accordance with a preferred embodiment of the present invention, the means for initiating further comprises: means for resolving a link to 100BaseT, if in auto-negotiation mode; and means for initiating a DLS, after the step of resolving.

In accordance with a preferred embodiment of the present invention, the means for initiating further comprises: means for determining if an energy detector indicator is raised in force mode; and means for initiating a DLS if the energy detector indicator is raised.

In accordance with a preferred embodiment of the present invention, a first unit; a cable having a plurality of twisted-pairs that are each coupled to the first unit; and a second unit that is coupled to each of the twisted-pairs, wherein the second unit communicates with the first unit through a 100BaseT link over the plurality of twisted-pairs, and wherein the second unit includes: a plurality of line drivers that are each configured to transmit signals over at least one of the twisted pairs; means for initiating a DLS having: means for resolving a link to 100BaseT, if in auto-negotiation mode; and means for initiating a DLS, after the step of resolving; means for determining if a drop link counter has be been reset; means for detecting energy transmitted across a twisted-pair if the drop link counter has been reset to begin a link up period; means for converging a cable length estimation during the link up period that: transmits idles; detects energy from transmitted idles; and calculates the length of the twisted pair so as to generate the cable length estimation; means for selecting one of a plurality of predetermined transmission amplitudes that corresponds to the cable length estimation, wherein the plurality of transmission amplitudes are 0.4V, 0.6V, 0.8V, and 1.0V; means for remaining silent for a link down period following the link up period The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 is a system in accordance with a preferred embodiment of the present invention.

DETAILED DESCRIPTION

Refer now to the drawings wherein depicted elements are, for the sake of clarity, not necessarily shown to scale and wherein like or similar elements are designated by the same reference numeral through the several views.

Referring to FIG. 1 of the drawings, the reference numeral 100 generally designates an example of a system in accordance with a preferred embodiment of the present invention. System 100 is generally an Ethernet system having units 102-1 and 102-2 that communicate with one another over twisted-pairs 104-1 and 104-2 via a 100BaseT connection. Typically, twisted pairs 104-1 and 104-2 can be category 5 or CAT5 cables, which can be as long as 120 m (or more). The units 102-1 and 102-2 also generally communicate with their respective media independent interfaces (MIIs) 108-1 and 108-2.

Each of these units 102-1 and 102-2 includes a several subcomponents (which may be included on a single integrated circuit or IC) that enable the 100BaseT physical layer (PHY) to establish a 100BaseT link. In particular, the units 102-1 and 102-2 respectively comprise medium dependent interfaces (MDIs) or medium dependent interface crossbars (MDIXs) 110-1 and 110-2 and internal circuitry 106-1 and 106-2.

Each of the MDIXs 110-1 and 110-2 include line drivers 112-1 and 112-2 to drive signals (including idles or idle signals). In conventional 100BaseT systems, the line drivers 112-1 and 112-2 would be have the transmission amplitudes always set to transmit over the maximum rated length (i.e., 120 m), which wastes power the twisted-pairs 104-1 and 104-2 (and their corresponding cable) is shorter than the maximum rated length. To address this shortcoming, MDIX 110-1 includes a state machine or power back-off (PBO) circuit 114; MDIX 110-2 may also include a PBO circuit. PBO circuit 114 is able to identify the PBO scenario and establish a 100BaseT link (with any other 100BaseT unit regardless of whether includes a PBO circuit similar to PBO circuit 114) using reduced power, all while maintaining link quality.

To generally ensure that the PBO circuit 114 can be fully automated and operate independently of circuitry in unit 102-2 in a PBO mode, PBO circuit 114 should be able to identify and adapt to various link scenarios for a dropped link. These scenarios are based on whether units 102-1 and 102-2 are in auto-negotiation mode or in force mode (deliberate link drop); there are four permutations.

In DLS mode, if either of the units 102-1 or 102-2 are in auto-negotiation mode, the link is resolved to 100BaseT prior to initiation of the DLS, and if both units 102-1 or 102-2 are in force mode, then DLS is initiated when the energy detector indicator is raised. To accomplish this, PBO circuit 114 employs a drop link counter that assists in distinguishing the scenarios. Essentially, the drop link counter operates to determine whether either unit 102-1 and/or unit 102-2 is in auto-negotiation mode. The drop link counter does this by counting over a predetermined period (which can be several seconds in length) and is triggered when energy is detected while the drop link counter is at 0. Generally, the predetermined length of the drop link counter (which generally defines the length of a Drop Link Sequence or DLS) is longer than the longest or "worst case" DLS, which generally ensures that a deadlock is avoided. A disadvantage of this drop link counter is that it generally defines the resolution for a "real" link drop. During a DLS (for the duration of the predetermined period), a "real" link drop is not detectable since every link failure during a DLS is considered part of the DLS.

In operation, the DLS can determine or suggest an amplitude for a given length of cable (i.e., length of twisted-pairs 104-1 and 104-2). A DLS begins when the drop link timer is 0 or has been reset and energy from a signal transmitted across the cable is detected. When the DLS begins, a link up period for the DLS begins, which occurs for a predetermined period that is maintained by a link up counter. During about the first 500 μs to about 1ms of the link up period, idles are transmitted by both units 102-1 and 102-2 over the cable or twisted-pairs 104-1 and 104-2 and detected. Based on the detected idles, the PBO circuit 114 can calculate the length of cable (i.e., length of twisted-pairs 104-1 and 104-2) to generate or converge the cable length estimation. To make this estimation, however, PBO circuit employs a passive correlation algorithm. Analog front end or AFE parameter variance in unit 102-1, the cable length estimation is associated with a range of values, and the attenuation for the idles are matched with a set of ranges associated with a given cable length. For example, assuming that the cable (i.e., twisted-pairs 104-1 and 104-2) is a CAT5 cable and 120 m is selected as the baseline length (or 0 dB), a −4 dB gain would correspond to a cable that is 105 m in length. Following the link up period, there is a link down period (maintained by a link down counter) where unit 102-1 remains silent, which should be sufficiently long for the unit 102-2 to drop the link. Generally, the link down period is greater than 750 ms.

Based on the estimated cable length, PBO circuit 114 can then set or suggest a corresponding transmission amplitude. Generally, there are several transmission amplitudes for the PBO circuit 114 to choose from, where each transmission amplitude would correspond to a range of lengths. For example, a set transmission amplitudes that are associated with "worst case" lengths can be seen below in Table 1, where 120 m is the baseline length.

TABLE 1

| Gain (dB) | Worst Case Length (m) | Transmission Amplitude (V) |
|---|---|---|
| −10 | 30 | 0.4 |
| −9 | 40 | 0.4 |
| −8 | 55 | 0.6 |
| −7 | 65 | 0.6 |
| −6 | 85 | 0.6 |
| −5 | 100 | 0.8 |
| −4 | 105 | 0.8 |
| −3 | 130 | 1.0 |
| −2 | 145 | 1.0 |
| −1 | 150 | 1.0 |
| 0 | 150 | 1.0 |
| 1 | 150 | 1.0 |
| 2 | 150 | 1.0 |
| 3 | 150 | 1.0 |

TABLE 1-continued

| Gain (dB) | Worst Case Length (m) | Transmission Amplitude (V) |
|---|---|---|

Thus, PBO circuit 114 is able to lower the transmission amplitude to correspond to the cable length so as to reduce power consumption.

Another option for establishing a PBO link is using the Quick PBO mode. During the Quick PBO mode, unit 102-1 assumes that the gain adjustment mechanism of unit 102-2 operates more than 500 µs after the first detection of usable energy. As a result, unit 102-1 records the far end energy (i.e., energy of pulse transmitted from unit 104-2) and estimates, accordingly, the cable length and reduction in the transmission amplitude (using a similar algorithm to the DLS). Generally, an 'on the fly' transmission amplitude estimation is used, assuming that unit 104-2 will be able still to converge on the new, selected transmission amplitude. Afterwards, the startup and establish link with the new settings can continue. Therefore, the delay from the drop link time period can be saved.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. A method comprising:
    initiating a power back-off (PBO) mode for one of a plurality of units coupled to one another over a twisted-pair so as to communicate over a 100BaseT connection;
    converging a cable length estimation during the link up period by:
        transmitting idles;
        detecting energy from transmitted idles; and
        calculating the length of the twisted pair so as to generate the cable length estimation; and
    selecting one of a plurality of predetermined transmission amplitudes that corresponds to the cable length estimation,
    wherein the step of initiating the PBO mode further comprises:
        initiating a drop link sequence (DLS);
        determining if a drop link counter has been reset; and
        detecting energy transmitted across the twisted-pair if the drop link counter has been reset to begin a link up period.

2. The method of claim 1, wherein the link up period is greater than 500 µs.

3. The method of claim 1, wherein the method further comprises remaining silent for a link down period following the link up period.

4. The method of claim 3, wherein the link down period is greater than 750 ms.

5. The method of claim 1, wherein the step of initiating further comprises:
    resolving a link to 100BaseT, if in auto-negotiation mode; and
    initiating a DLS, after the step of resolving.

6. The method of claim 1, wherein the step of initiating further comprises:
    determining if an energy detector indicator is raised in force mode; and
    initiating a DLS if the energy detector indicator is raised.

7. The method of claim 1, wherein the plurality of transmission amplitudes are 0.4V, 0.6V, 0.8V, and 1.0V.

8. The method of claim 1, wherein the step of initiating the PBO mode further comprises:
    initiating a Quick PBO mode;
    initiating a 100BaseT link in the Quick PBO mode;
    detecting and recording energy transmitted across the twisted-pair during a record mode period.

9. An apparatus comprising:
    means for initiating a power back-off (PBO) mode for one of a plurality of units coupled to one another over a twisted-pair so as to communicate over a 100BaseT connection;
    means for converging a cable length estimation during the link up period that:
        transmits idles;
        detects energy from transmitted idles; and
        calculates the length of the twisted pair so as to generate the cable length estimation;
    and
    means for selecting one of a plurality of predetermined transmission amplitudes that corresponds to the cable length estimation,
    wherein the step of initiating the PBO mode further comprises:
        initiating a drop link sequence (DLS);
        determining if a drop link counter has be been reset; and
        detecting energy transmitted across the twisted-pair if the drop link counter has been reset to begin a link up period.

10. The apparatus of claim 9, wherein the link up period is greater than 500 µs.

11. The apparatus of claim 9, wherein the apparatus further comprises means for remaining silent for a link down period following the link up period.

12. The apparatus of claim 11, wherein the link down period is greater than 750 ms.

13. The apparatus of claim 9, wherein the means for initiating further comprises:
    means for resolving a link to 100BaseT, if in auto-negotiation mode; and
    means for initiating a DLS, after the step of resolving.

14. The apparatus of claim 9, wherein the means for initiating further comprises:
    means for determining if an energy detector indicator is raised in force mode; and
    means for initiating a DLS if the energy detector indicator is raised.

15. The apparatus of claim 9, wherein the plurality of transmission amplitudes are 0.4V, 0.6V, 0.8V, and 1.0V.

16. The apparatus of claim 9, wherein the means for initiating the PBO mode further comprises:
    means for initiating a Quick PBO mode;
    initiating a 100BaseT link in the Quick PBO mode;
    detecting and recording energy transmitted across the twisted-pair during a record mode period.

17. An apparatus comprising:
    a first unit;
    a cable having a plurality of twisted-pairs that are each coupled to the first unit; and
    a second unit that is coupled to each of the twisted-pairs, wherein the second unit communicates with the first unit through a 100BaseT link over the plurality of twisted-pairs, and wherein the second unit includes:

a plurality of line drivers that are each configured to transmit signals over at least one of the twisted pairs;

means for initiating a drop link sequence(DLS) having:
   means for resolving a link to 100BaseT, if in auto-negotiation mode; and
   means for initiating a DLS, after the step of resolving;

means for determining if a drop link counter has be been reset;

means for detecting energy transmitted across a twisted-pair if the drop link counter has been reset to begin a link up period;

means for converging a cable length estimation during the link up period that:
   transmits idles;
   detects energy from transmitted idles; and
   calculates the length of the twisted pair so as to generate the cable length estimation;

means for selecting one of a plurality of predetermined transmission amplitudes that corresponds to the cable length estimation, wherein the plurality of transmission amplitudes are 0.4V, 0.6V, 0.8V, and 1.0V;

means for remaining silent for a link down period following the link up period.

18. The apparatus of claim 17, wherein the means for initiating further comprises:
   means for determining if an energy detector indicator is raised in force mode; and
   means for initiating a DLS if the energy detector indicator is raised.

\* \* \* \* \*